United States Patent
Swanstrom

[19]

[11] Patent Number: 5,927,920

[45] Date of Patent: Jul. 27, 1999

[54] PROGRESSIVELY-FORMED THREADED INSERT

[75] Inventor: Kenneth A. Swanstrom, Doylestown, Pa.

[73] Assignee: Penn Engineering & Manufacturing, Danboro, Pa.

[21] Appl. No.: 09/162,989

[22] Filed: Sep. 30, 1998

Related U.S. Application Data

[60] Provisional application No. 60/064,504, Nov. 5, 1997.

[51] Int. Cl.⁶ .............................. F16B 37/04; F16B 37/16
[52] U.S. Cl. .............................. 411/180; 411/61; 411/437; 470/25
[58] Field of Search .................................. 411/61, 73, 74, 411/180, 182, 433, 437; 470/25

[56] References Cited

U.S. PATENT DOCUMENTS

| | | |
|---|---|---|
| 1,111,749 | 9/1914 | Joseph . |
| 2,462,010 | 2/1949 | Spender .............................. 411/180 X |
| 3,006,231 | 10/1961 | Kahn . |
| 3,314,509 | 4/1967 | Pelikan . |
| 3,433,119 | 3/1969 | Ballantyne et al. . |
| 3,496,800 | 2/1970 | Brezinski . |
| 3,532,323 | 10/1970 | Uhen . |
| 3,973,295 | 8/1976 | Janke . |
| 4,354,782 | 10/1982 | Newport ..................................... 411/61 |
| 4,430,033 | 2/1984 | McKewan . |
| 4,610,589 | 9/1986 | Bredal ..................................... 411/74 X |
| 5,036,674 | 8/1991 | Chang ..................................... 411/61 X |
| 5,419,043 | 5/1995 | Laue . |
| 5,509,769 | 4/1996 | Larson et al. . |
| 5,807,050 | 9/1998 | Daler et al. . |

*Primary Examiner*—Neill Wilson
*Attorney, Agent, or Firm*—Gregory J. Gore

[57] ABSTRACT

An insert for plastic sections is manufactured from a flat strip of metal by high-speed progressive die-stamping which forms the strip into a threaded female insert. The metal strip is first cut into a flat blank and then thread regions are impressed on the face of the strip, providing a thread pitch profile. During the stamping operation, the strip is folded to form a triangular hollow tube with sharp-edged protrusions extending radially outward from each corner of the triangle. A tab and interlocking cutout secure the abuting longitudinal side edges of the strip and ensures axial alignment of the thread regions. As a result of the folding and stamping process, the thread regions lie along the interior wall of the tubular construction and define a thread pitch diameter which will accept the screw threaded into the center of the insert. The resulting triangular insert is sized so that a diameter describing the outside corners of the insert is equal to or slightly larger than the diameter of the intended receiving hole, while the barbs extend to a greater diameter than the hole. A closure may be included at the bottom of the insert to provide surrounding material from entering the insert channel as the insert is installed.

13 Claims, 6 Drawing Sheets

PROGRESSIVELY-FORMED THREADED INSERT

Priority based upon provisional application Ser. No. 60/064,504 filed on Nov. 5, 1997, entitled "PROGRESSIVELY-FORMED THREADED INSERT", is hereby claimed.

FIELD OF THE INVENTION

This invention relates to internally threaded metallic inserts installed in plastic housings to provide strong threads in ductile materials. More specifically, this invention relates to an alternate means of producing these inserts that significantly reduces the manufacturing costs.

BACKGROUND OF THE INVENTION AND DESCRIPTION OF PRIOR ART

A common method of providing strong threads in plastic sections is achieved through the use of internally threaded metallic inserts. Such products are commonly available from many domestic as well as foreign sources, such as Yardley Inserts, P.S.M. International, Groove-Pin Corporation, and others. These inserts are usually manufactured from a non-ferrous material such as brass, but may also be manufactured from steel, stainless steel, or aluminum, and are tubular devices containing internal threads. They are either molded into plastic sections or installed in plastic sections having a suitable receiving hole or boss. The installation process consists of pressing the inserts into the receiving hole by means of an axial force sufficient to develop the required installation pressure, and may include heat, ultrasonic insertion, or a combination of these procedures.

The outside diameters of the inserts typically have ribs or grooves that provide a high resistance to pull-out due to the flow of plastic material around and into the ribs or grooves during the installation process. The ribs or grooves are typically used in combination with knurls that develop a high torque resistance between the insert and the plastic section. When the insertion process employs only the application of axial force without heat, the resilience of the material comprising the inside wall of the receiving hole can provide sufficient force to grip the ribs and knurls after the insert has been driven into the hole.

Heretofore, such inserts have been manufactured from bar stock on screw machines at production rates ranging from 800 to 1500 pieces per hour. The consumption of raw material is significant in producing these inserts, as the finished parts typically represent only 50% of the weight of the unmachined blank. Having machined (tapped) internal threads, there also exists the possibility of such inserts being shipped with substandard or missing threads due to tap wear and/or breakage, which can cause great hardship to the end user during final assembly when such defective or missing threads are discovered. Also, the internal threads of such inserts have been found to entrap miscellaneous materials, such as machining chips, which again can be a considerable drawback to end product quality.

Furthermore, inserts which are installed without the use of heat or ultrasonics are limited to use in plastic materials which have sufficient resilience to grip the ribs and knurls after the deformation of insertion. This may preclude using these inserts in harder or filled plastics which usually have high melting points and are designed for severe applications. There is therefore a need in the art for a more cost-effective and reliable metallic insert for plastic sections which may be used in a wide variety of plastic materials.

The most pertinent patent prior art of which the applicant is aware includes U.S. Pat. No. 3,433,119 issued to Ballantyne et al on Mar. 18, 1969. This reference discloses a longitudinal sheet metal insert with internal and external punched-out barbs for insertion into a plastic material prior to receiving a threaded member. U.S. Pat. No. 3,496,800 discloses a triangularly-shaped sleeve which is internally threaded by pressing a tubular member against an internally-positioned threaded die. U.S. Pat. No. 3,314,509 issued to Olson on Mar. 23, 1943 discloses the use of a longitudinally-folded sheet metal fastener having interrupted threads which are embossed into the sheet metal. U.S. Pat. No. 3,006,231 issued to Kahn on Oct. 31, 1961 discloses an internally-threaded nut formed from longitudinally-folded sheet metal where the threads are preformed on the sheet. U.S. Pat. No. 3,532,323 issued to Uhen on Oct. 6, 1970 discloses a laterally-folded sheet metal nut having slots cut into the sheet which receive and engage the external threads of a bolt. U.S. Pat. No. 5,419,043 issued to Laue on May 30, 1995 discloses a longitudinally-folded fastener with thread indentations that utilizes an alignment tab. U.S. Pat. No. 1,111,749 issued to C. Joseph on Sep. 29, 1914 discloses a sheet metal insert, longitudinally folded, which employs outward-facing barbs and thread-engaging cutouts. U.S. Pat. No. 4,430,033 issued to McKewan on Feb. 7, 1984 discloses a sheet metal insert for foam plastic which includes an outward-facing rippled surface and interfacing thread-engaging ribs.

However, none of the above teachings suggest the use of forming an internally-threaded insert by progressive impact stamping of sheet material and then folding the stamped sheet. The use of this method of fastener formation permits economies of manufacture which are heretofore unattainable by any of the known prior art processes for forming threaded inserts.

SUMMARY OF THE INVENTION

In order to fulfill the need in the art described above, this invention provides an insert for plastic sections advantageously manufactured from a flat strip of metal, such as brass. Made according to the present invention, the insert is stamped from raw material in the form of strip stock in a progressive manner on a high-speed press. Production rates typically run from 500 to 1200 parts per minute. Furthermore, there is much less scrap as a percentage of the prepunched blank, and the scrap that results from the stamping operation is in a more marketable form.

The strip is formed into a threaded female insert by progressive die formation. The raw material strip is first cut into a flat blank having a pattern which includes lancing sharp edge protrusions into the strip along three parallel foldlines. In the next step, three regions on the face of the strip are impressed or otherwise formed with a thread pitch profile. As the formation process continues, the strip is folded along the foldlines to form a triangular hollow tube. The sharp-edged protrusions extend radially outward from each corner of the triangle, forming barbs representing the greatest diameter of the tube. In order to hold the folded tube in a closed condition to ensure secure engagement of the threaded screw, the blank includes an interlocking tab and mating cutout. The tab is keystone-shaped and fits into the interlocking cutout of a corresponding shape so that after folding, the abutting side edges of the strip are locked together to resist separation. The interlocking tab also holds the edges of the strip in axial alignment to ensure registration of the thread regions.

As a result of the folding process, the threaded regions lie along the interior wall of the tubular construction and define a thread pitch diameter which will accept a screw threaded into the center of the insert. The resulting triangular insert is sized so that a diameter circumscribing the outside corners of the insert is equal to or slightly larger than the diameter of the intended receiving hole, while the barbs extend to a greater diameter than the hole.

An additional structure in the form of a closure may be included at the bottom of the insert to prevent surrounding material from entering the insert channel as the insert is installed. The closure is formed by providing a triangular projection at the bottom edge of the blank between the two longitudinal foldlines. A lateral foldline of the closure is established perpendicular to the three tube-forming foldlines so that through the progressive folding process, the closure occupies a position across the bottom of the folded tube to cover the opening at one end. The end cap may also function as a stop to prevent projection of the screw from the end of the insert to prevent contact with other structures.

As an added feature, the processed raw material stock described above preferably retains a carrier strip resulting from the remainder of uncut material along one or both of the top and bottom edges. As further described, the completed, folded fasteners remain secured to the carrier strip by a small interconnecting tang which is easily severable. Fully-formed inserts may therefore be handled and stored as separate devices held by a strip turned into a roll. This affords the possibility of delivery to an automated insertion tool, whereby each fastener is delivered to the insertion site on the strip and then simultaneously severed from the strip as it is pressed into the receiving hole in the housing.

The insert of the present invention described above may be installed by an axial force with the use of heat, pressure, ultrasonics, or any combination of these methods. Even without the use of methods which cause the flow of material about the insert, the present invention provides an effective installation. The barbs are sharp teeth which are formed at a backward-facing angle, which upon introduction into the mounting hole, tend to fold towards the body of the insert. When the insert is fully installed into its receiving hole, the barbs' outward resilience offers sufficient force so that they dig into the side wall of the receiving hole and hook into the surrounding material in reaction to pullout forces. As the insert is press-fitted into place, the sides of the barbs also resist torque-out forces since they are larger than the diameter of the receiving hole and upon insertion dig longitudinal grooves into the side wall of the hole. The engagement of the barbs with the formed grooves secures the insert against rotation. Thus, the barbs provide both torque-out and pullout resistance, even with a cold insertion process into sections of plastic which are relatively non-resilient.

The insertion process may be aided by a tool which both presses and rotates the insert as it is force-fitted into the receiving hole in the plastic section. The degree of rotation needs only be slight through the full length of the insertion stroke. This twist-insertion ensures that material removed from the receiving hole wall by the barbs during installation does not form straight grooves which would otherwise lie directly above each of the barbs. Pullout resistance is therefore increased as the barbs dig into the full amount of side wall material which lies directly above them. Similarly, torque-out resistance may also be enhanced. The twist insertion may be further facilitated by canting the barbs at an angle relative to the axis of the insert so that the force of the material against the barbs provides some or all of the twisting force to the insert.

The present invention thus provides an inexpensive and efficient means for providing a threaded metal insert that may be used in plastic sections which is economical to manufacture and effective in a wide variety of materials, including harder plastics with a high melting point. Other objects and advantages will be apparent from the following drawings and description of the preferred embodiment.

DESCRIPTION OF THE PREFERRED EMBODIMENT

Figure 1:
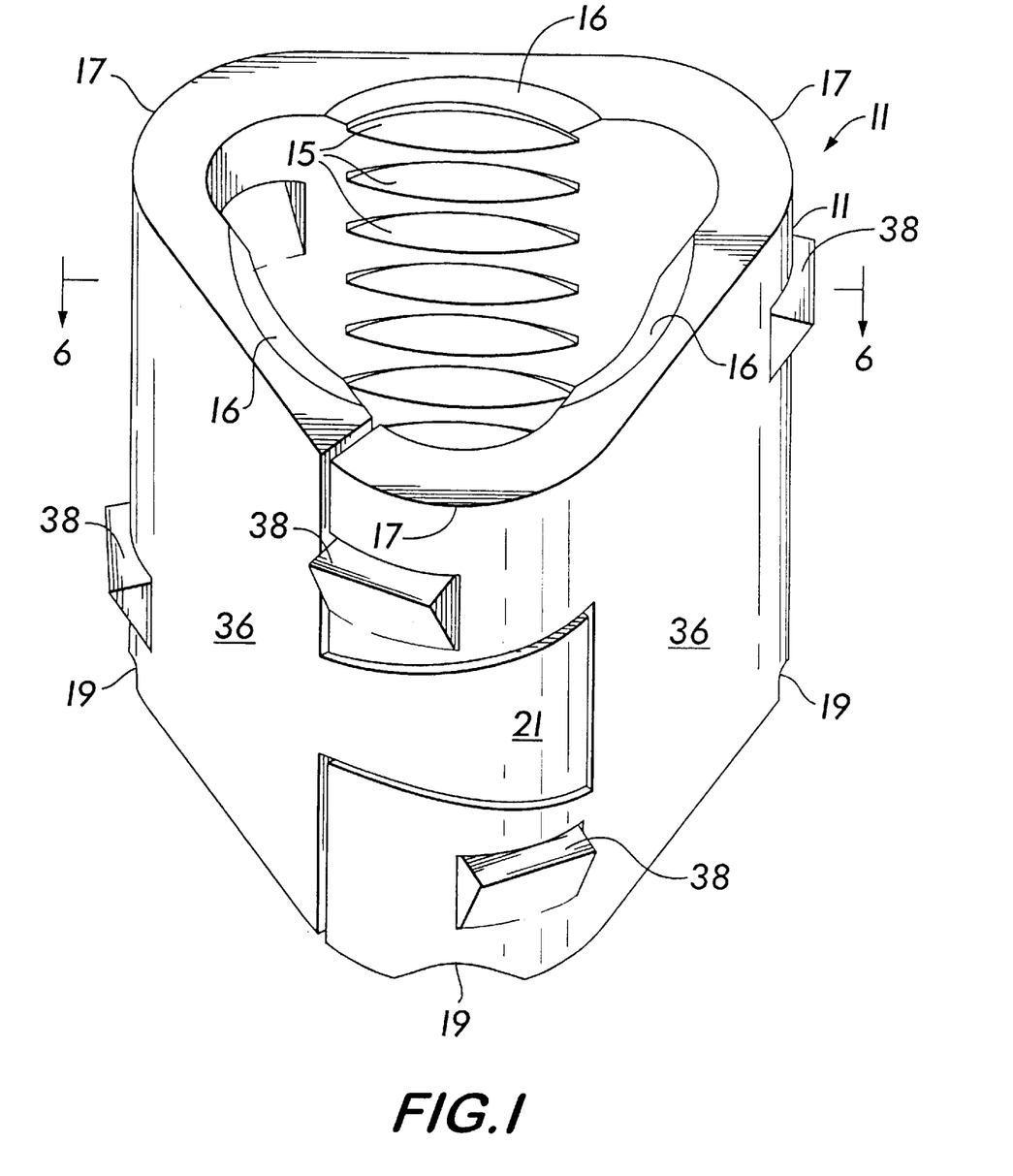
FIG. 1 is a top front isometric view of the fastener insert of the present invention.

Referring now to FIG. 1, a fully-formed fastener insert 11 of one embodiment of the present invention is shown. The fastener is formed by progressive die-stamping and folding a blank of sheet material along three foldlines to form a triangular, closed tube having sides 36 and a longitudinal seam. In addition, as will later be described, thread impressions 15 are also made into the surface of the blank so that when folded into a closed tube, they provide thread-engaging surfaces for a screw threaded into the center. Screw lead-in chamfers 16 are also impressed into the material along the top edges of each of the three sides. Corners 17 are formed by the folding operation and include outward-facing barbs 38 which project radially from each corner. The barbs are staggered radially and axially and function to grip into the surrounding material into which the insert is installed. Insert lead chamfers 19 are formed at the bottom (insertion end) of each corner. Keystone-shaped tab 21 fits into a corresponding cutout in the opposite edge of the strip material which the tab abuts. The tab holds the seam between the abutting side edges of the folded material closed and maintains alignment of the threads.

Figure 2:
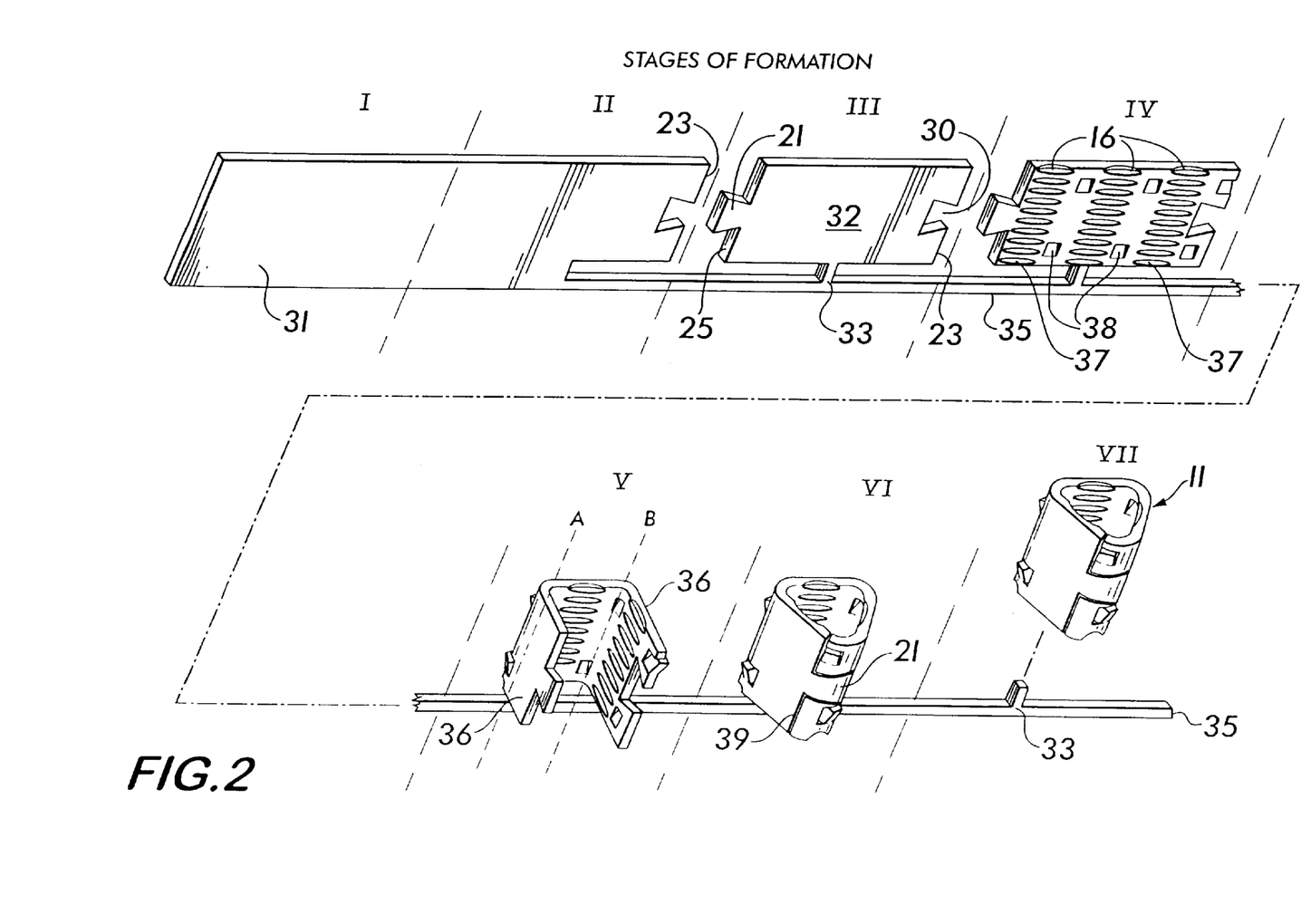
FIG. 2 is a top left front isometric view of the fastener insert of the present invention shown in various stages of sequential formation.

In FIG. 2, the present invention is shown at various stages of a progressive formation created by the use of progressive impact dies. The strip has a front and rear surface and the forming steps are mostly performed on the front surface of the strip which, after folding, becomes the inside surface of the fastener. This method is an important feature of the invention which provides great economies of production. Shown as Stage I, the fastener begins as a flat strip of stock 31 composed of a suitable material, such as brass.

At Stage II, the strip 31 begins being cut out first on the leading edge 23 which includes interlock cutout 30. Then, the trailing edge 25 is cut, resulting in a blank 32 shown in Stage III. At this stage, the perimeter of an individual insert blank is fully formed with one side edge including a keystone tab 21, and the other side edge including an interlocking cutout 30 in a keystone shape corresponding to the tab. In this preferred embodiment, the tab is in the shape of a keystone, but other locking shapes may also be employed. Throughout the process, frangible tangs 33 connect the body of the individual fastener blanks to a carrier strip 35 which is an uncut portion of the material that lies along the bottom edge of the material. An additional carrier strip (not shown) may be included along the top edge of the material. The carrier thus will continue to hold each individual fastener, even after formation. Individual fasteners may later be severed from the strip when installed.

At Stage IV, the fastener has been further formed by embossing three lead-in chamfers 16 and three longitudinal thread regions 37 into the front face of the blank. Also formed at this stage are barbs 38 created by punching and folding out three-sided cuts through the blank. These structures are shown in greater detail in FIGS. 3, 4 and 5. At Stage V, the blank is then folded along two foldlines A and B which brings the fastener into a U-shape with two parallel sides 36. At Stage VI, the ends of the sides 36 are brought together at seam 39 and tab 21 is folded over and inserted into the cutout 30 on the opposite side of the blank, thus holding seam 39 closed. Insert lead chamfers 19 are formed into the rear side of the blank by a die so that they occur at the outside bottom of each corner. Stage VII shows the completed fastener 11 separated from tang 33 now ready for installation.

Figure 3:
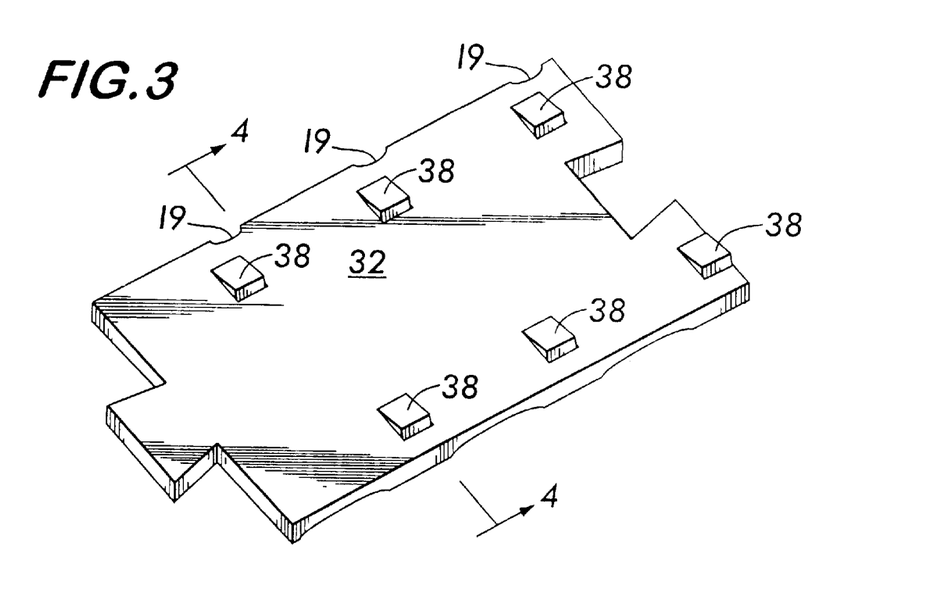
FIG. 3 is a top left rear isometric view of a segment of the blank at an intermediate stage of formation from which the fastener is formed.
Figure 4:
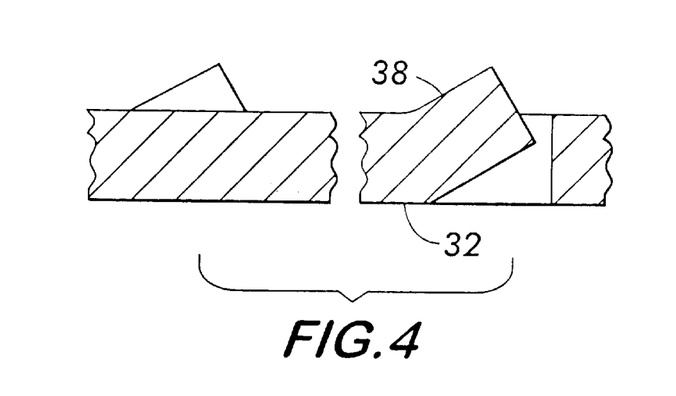
FIG. 4 is a side sectional view taken from FIG. 3 as shown in that figure.

Referring now to FIGS. 3 and 4, the blank at Stage IV of the fastener formation described above with regard to FIG. 2 is shown in isolation. FIG. 3 depicts the rear surface of the blank and shows projecting barbs 38 which are formed by punching and bending out small sections of the sheet. This side becomes the outside of the fastener after folding. Insert lead chamfers 19 are impressed into the rear surface of the blank by a die behind the strip. FIG. 4 shows in greater detail the barbs 38 punched and folded outwardly from the rear surface of the blank. It will be appreciated from this figure that the barbs project at an angle which is preferably oriented upward or in the opposite direction of insertion of the fastener. This provides a reduced insertion force and an increased pull-out force due to the wedging action of the angled barbs against the surrounding material.

Figure 5:
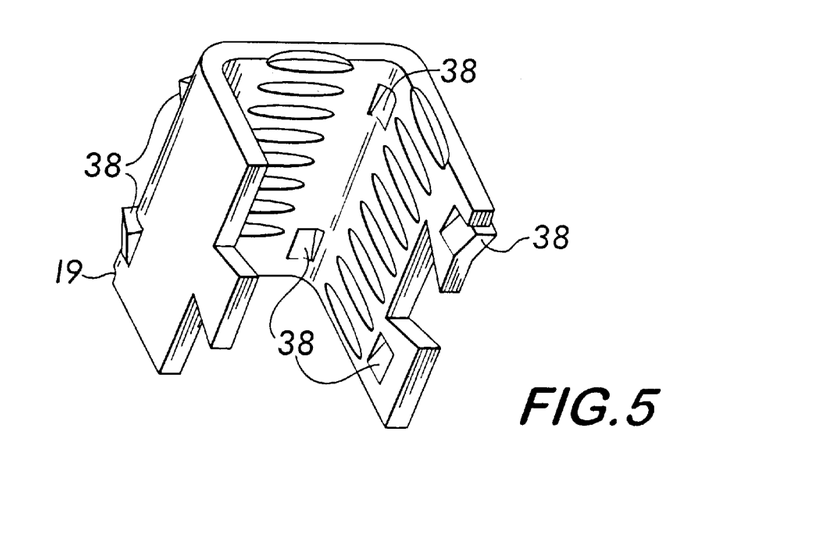
FIG. 5 is a top left front isometric view of a segment of the fastener blank at an intermediate stage of formation shown in FIG. 2.

FIG. 5 shows the state of the fastener formation shown in Stage V of FIG. 2. It is clearly shown in this figure that the barbs 38 are located along the folds which will become the corner areas of the completed fastener. Placing the barbs in this location has many advantages. First, because they are located at the corners of the tube, they will have the greatest outside diameter of the fastener. This offers the greatest degree of bite into the surrounding material into which they will be installed. Secondly, the punched-out sections in the area of the foldlines produce an inherent weakness in the material which makes it easier to fold. Finally, the corner areas do not contain thread impressions and therefore the use of material in this area to form the barbs does not reduce the amount of thread regions.

Figure 6:
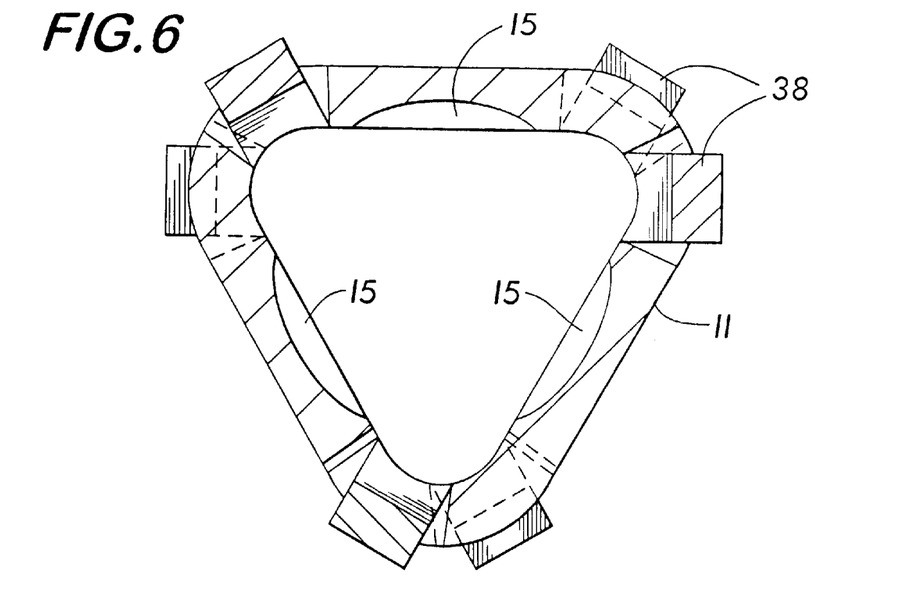
FIG. 6 is a top plan view of the embodiment of the invention shown in FIG. 1.

Referring to FIG. 6, the final location of the thread impressions after folding is shown. The thread impressions 15 are arcuate indentations which lie in three regions, one on each side of the fastener. These dish-shaped indentations are formed so that the shape of the indentations as a group will fall along the circular circumference of an imaginary cylinder taken from a central axis of the tube when the blank is fully folded. The volume of the indentations defines chordal sections of a space corresponding to male screw threads. The thread indentations are formed of sufficient depth and appropriate lead angle such that the insert will properly receive a corresponding screw threaded into it.

Figure 7:
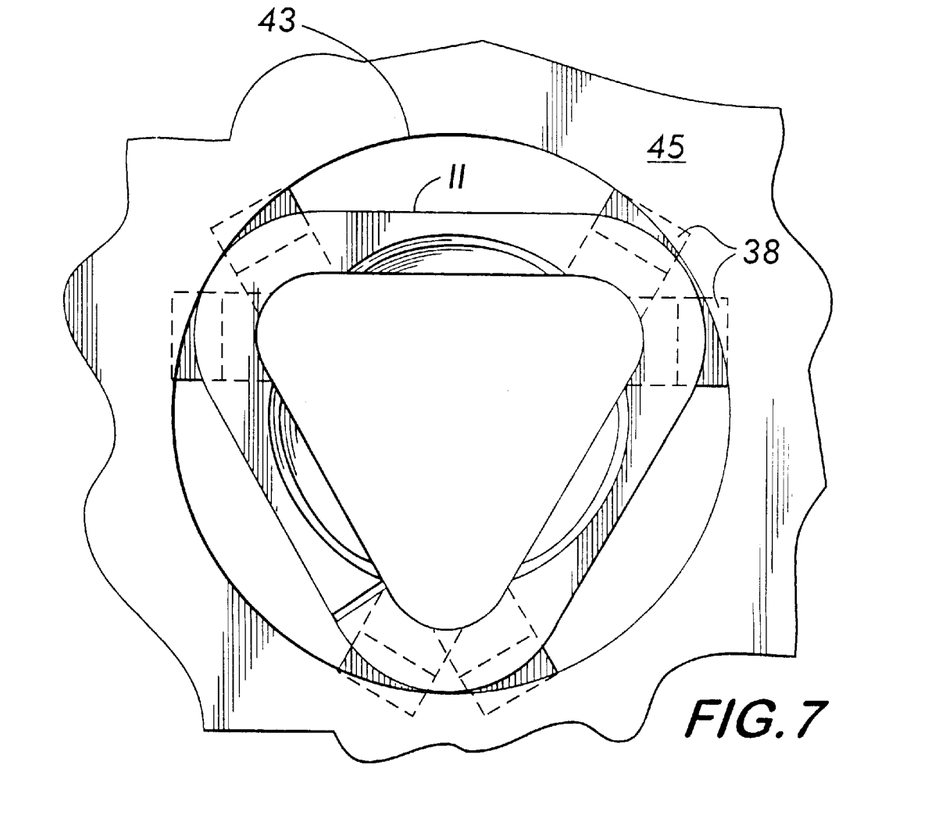
FIG. 7 is a top plan view of the present invention shown installed into a mounting hole formed in a substrate.

In FIG. 7, the insert 11 of the invention is shown installed into a plastic section 45. As depicted in this figure, the barbs 38 are shown embedded into the side wall material of mounting hole 43 at each of the three corners of the insert. Once installed, the threaded indentations of the insert are ready to receive a corresponding threaded member such as a screw. The material surrounding the insert into which it is installed provides additional support and dimensional integrity. Although staggered axially, the barbs are evenly spaced radially about each corner of the insert to provide balanced push-in and pull-out forces.

Figure 8:
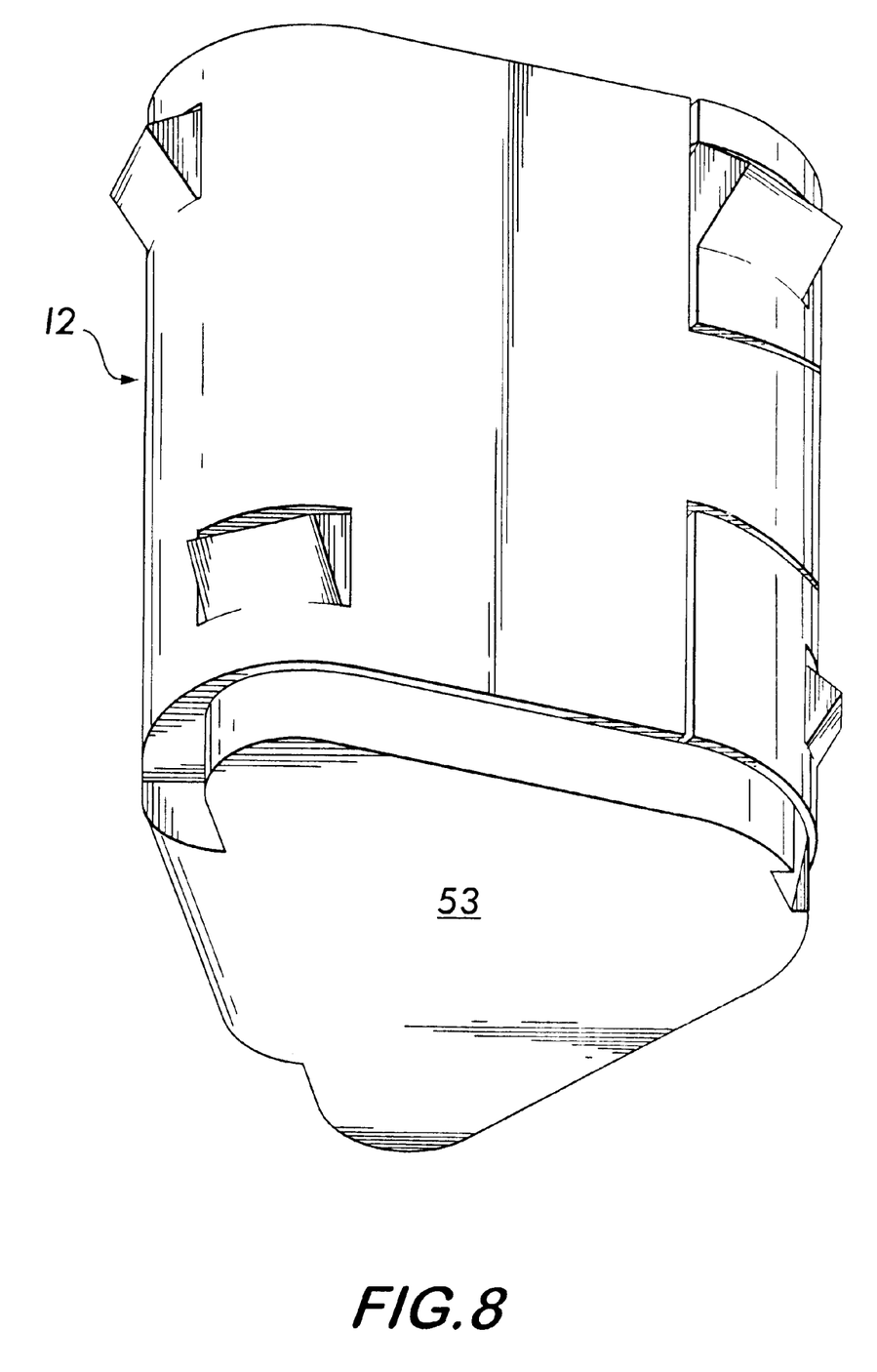
FIG. 8 is a bottom front isometric view of an alternate embodiment of the present invention.

FIG. 8 shows an alternate embodiment 12 of the invention. This fastener is similar to the fastener described in FIG. 1, except that a bottom cap 53 is provided during formation of the fastener so that it covers the bottom opening of the fully formed fastener channel. The cap functions to prevent surrounding fluid material from entering the fastener during insertion which could possibly interfere with the threaded engagement between the insert and a threaded member. This is particularly important when the insert is used in a plastic material where the material in the area of the mounting hole is flowable during installation. Also, the end cap may function as a stop to prevent projection of the screw from the end of the insert to protect against contact with other structures.

Figure 9:
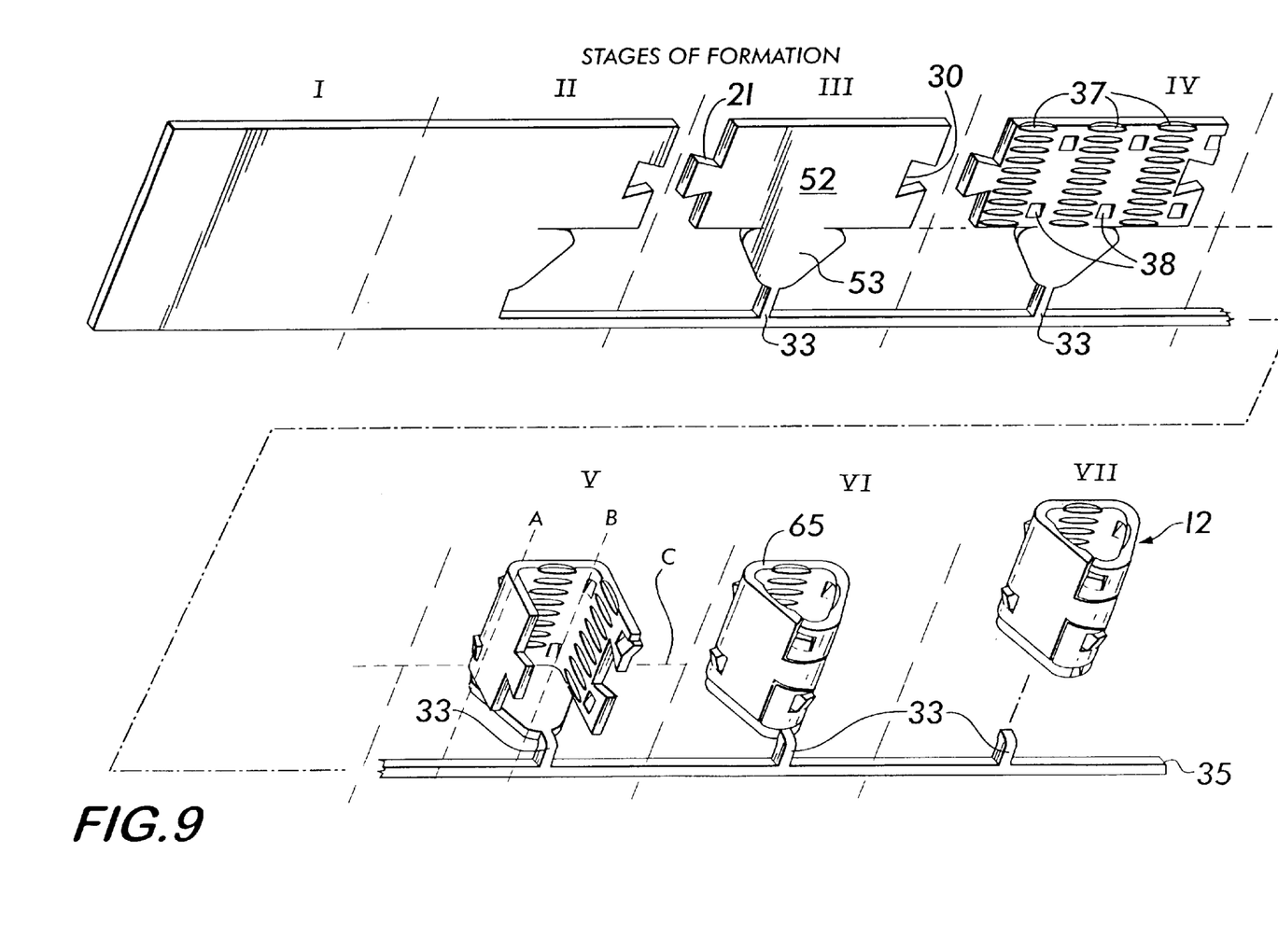
FIG. 9 is a top left front isometric view showing the formation sequence of the embodiment of the invention depicted in FIG. 8.

Referring now to FIG. 9, the fastener 12 shown in FIG. 8 is formed in a manner similar to that of the embodiment shown in FIG. 1, explained in detail with reference to FIG. 2. However, this embodiment includes a bottom cap 53 located between the main body of the blank 52 and the interconnecting tang 33. During the formation process, the cap 53 is folded laterally along a foldline C which is perpendicular to the other corner foldlines so that the cap completely covers the opening in the bottom of the fastener as shown in FIG. 8. Like the fastener in the previous embodiment, the completed fastener 12 is maintained in attachment with the carrier strip 35 until it is severed from the attaching tang 33.

As described above, by progressively die-stamping a sheet of material and forming it into an internally-threaded insert, great economies of manufacture can be achieved. Furthermore, holding the individual fasteners on a carrier strip provides the added advantages of ease of inspection, transportation, and sequential delivery to an automated installation device which separates the fastener from the strip and presses individual fasteners into mounting holes. The embodiments disclosed therefore achieve the objects of the present invention to provide a threaded metal insert that may be used in plastic sections which is economical to manufacture and install.

It should be readily understood, however, that there are many modifications to the invention without departing from its spirit or scope. For example, although the fastener of the present invention is shown formed having three sides, similar structures may be employed with additional foldlines so that a four or five-sided fastener could also be made. The three-sided embodiment is preferred; however, because of the greater amount of material between the thread portions which is available for forming the barbs. The greater the number of sides, the less amount of material between adjacent thread portions is available. It should also be understood that although the preferred steps of forming the threaded insert of the present invention are described in a given sequence, that the order of the steps may be changed to achieve the same result. Similarly, there are many other possible modifications, however, the invention shall be limited only by the following claims and their legal equivalents.

What is claimed is:

1. A threaded metal insert, comprising:
   a tube-like channel having a polygonal cross-section and being comprised of a plurality of planar longitudinal faces intersecting at corner areas;
   a plurality of external barbs protruding radially from said corner areas such that the ends of said barbs collectively define the greatest outside diameter of said insert; and
   a plurality of thread regions comprising longitudinal rows of indentations on inside surfaces of each of said planar faces.

2. The insert of claim 1, wherein said cross-section is triangular.

3. The insert of claim 2, further including a closure at the bottom of said insert, said closure being an extension of one planar face folded laterally inward at the bottom of said one side.

4. The insert of claim 1, further described as a folded strip of material having first and second side edges which meet in abutment along a longitudinal seam.

5. The insert of claim 4, wherein said first side edge includes a cutout and said second side edge includes a tab corresponding to said cutout whereby said seam is held together by inserting said tab into said cutout.

6. The insert of claim 5, further including insert lead chamfers located at the bottom outside edge of each of said corner areas.

7. The method of forming a threaded metal insert, comprising a tube-like, elongate channel of polygonal cross-section and a plurality of substantially planar faces with corners having barbs protruding therefrom, comprising the steps of:

providing an elongate strip of metal;
   cutting said strip into fastener blanks, each blank having leading and trailing side edges;
   embossing said fastener blanks with arcuate indentations into a front surface thereof, said indentations arranged in spaced longitudinal rows; and
   folding said strip into a tube-like channel along longitudinal foldlines located between said rows of indentations such that wells of said indentations define chordal sections of a space corresponding to an externally-threaded member.

8. The method of forming a threaded insert of claim 7, wherein said step of embossing further includes the simultaneous punching and folding out of areas around said foldlines producing outwardly-projecting barb-like structures protruding from an opposite side surface of said blanks.

9. The method of forming a threaded insert of claim 8, wherein a first edge of said blank includes a tab, and an opposite edge of said blank includes a cutout corresponding to the shape of said tab.

10. The method of forming a threaded insert of claim 9, further including the step of inserting said tab into said cutout to hold said edges in a fully-folded condition, said edges being in abutment along a longitudinal seam.

11. The method of forming a threaded insert of claim 10, further including a final step of laterally folding a cap portion of said blank which extends from the bottom edge of one of said planar faces, said cap portion substantially closing an opening at the bottom of said insert after lateral folding.

12. The method of forming a threaded insert of claim 11, wherein after folding, said barbs collectively define the greatest outside diameter of said insert and project upwardly at an angle.

13. The method of forming a threaded insert of claim 7, wherein all of said fastener blanks remain connected to a common carrier portion of said strip after formation.

* * * * *